United States Patent
Smadar et al.

[15] 3,677,443
[45] July 18, 1972

[54] APPARATUS FOR DISPENSING FROZEN COMESTIBLES

[72] Inventors: Yechiel Smadar, New York; Abraham H. Goodman, Great Neck, both of N.Y.

[73] Assignee: DCA Food Industries, Inc., New York, N.Y.

[22] Filed: July 14, 1969

[21] Appl. No.: 841,193

[52] U.S. Cl. .................................. 222/94, 62/391, 222/95, 222/146 C
[51] Int. Cl. ..................................... B65d 35/22, B67d 5/62
[58] Field of Search ................ 222/146 C, 373, 386.5, 146 R, 222/95, 106, 94; 62/386, 391, 394, 294, 457; 239/128

[56] References Cited

UNITED STATES PATENTS

| | | | |
|---|---|---|---|
| 1,715,922 | 6/1929 | Hix | 222/129.1 |
| 3,320,767 | 5/1967 | Whalen | 62/294 |
| 3,283,530 | 11/1966 | Bayne et al. | 62/457 |
| 3,229,478 | 1/1966 | Alonso | 222/146 C |

Primary Examiner—Robert B. Reeves
Assistant Examiner—Francis J. Bartuska
Attorney—Amster & Rothstein

[57] ABSTRACT

A non-dairy food product having the texture and eating characteristics of soft-serve ice cream is prepared from a composition of matter comprising a sweetener, hydrolyzed starch conversion products, microcrystalline cellulose, hydrogenated shortening, caseinate and water. The product, as well as other food products, can be dispensed from a self-refrigerating dispenser containing a refrigerant under pressure surrounding a flexible product bag. Actuation of control means on the dispenser permits a portion of the refrigerant to expand thereby cooling the product while the unexpanded portion of the refrigerant squeezes the product bag causing the product to flow.

7 Claims, 3 Drawing Figures

Patented July 18, 1972 3,677,443
FIG. 1
FIG. 2
FIG. 3
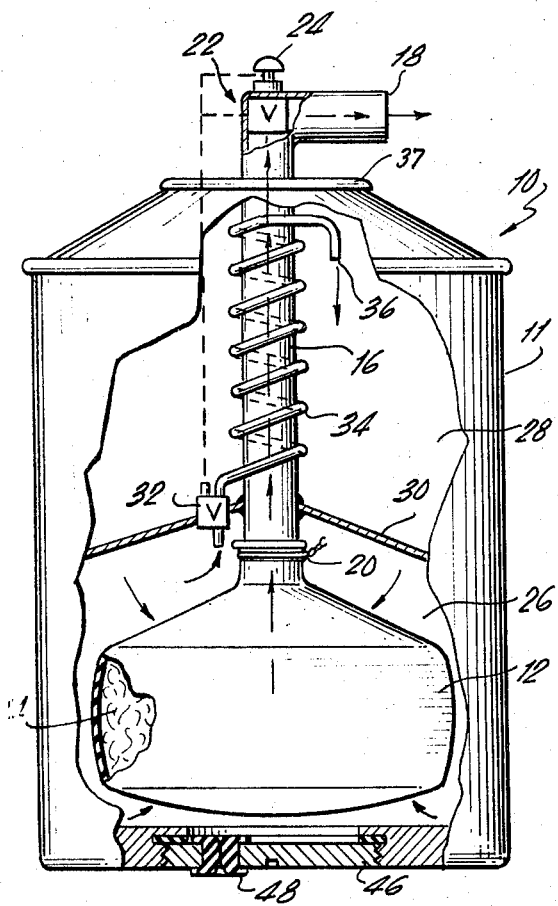
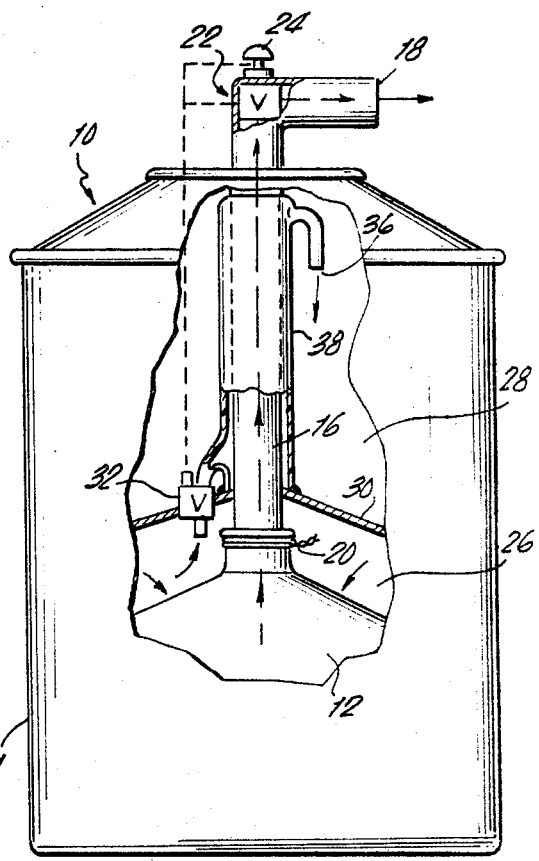
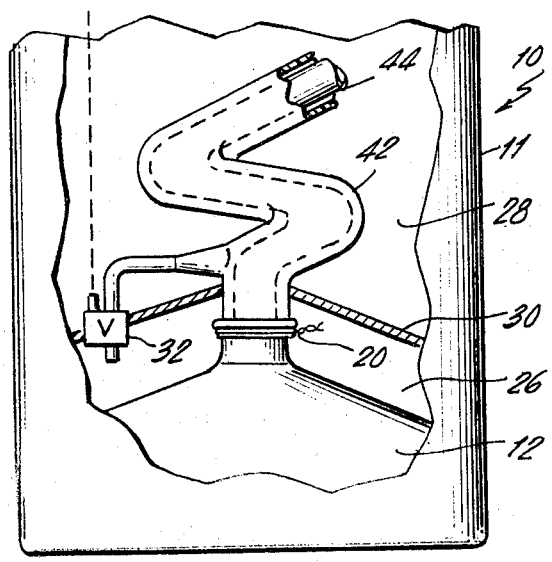
INVENTORS
YECHIEL SMAGAR
ABRAHAM GOODMAN
BY
Amster & Rothstein
ATTORNEYS

APPARATUS FOR DISPENSING FROZEN COMESTIBLES

The present invention relates generally to improvements in comestibles and particularly to a novel composition, method and apparatus for dispensing a frozen comestible in the nature of an ice cream product.

Conventional soft-serve ice cream is prepared from a basic vanilla or chocolate dairy mix which consists of approximately 35 percent solids and 65 percent water. The solids content is generally composed of about 10 percent butter fat, 16 percent sugar, 8 percent serum solids and 1 percent stabilizers and emulsifiers. It is well known in the art that the texture and eating characteristics of soft-serve ice cream are achieved by reducing the temperature of a dairy mix, as above described, so that 42.5 to 56.5 percent of the water in that mix is converted to ice crystals. In order to form the required percentage of ice crystals it has been found that the temperature of the dairy mix must be between 21° to 24° F. Thus, soft-serve ice cream is normally dispensed from a freezer which maintains the dairy mix within the above required temperature range. In addition, the soft-serve ice cream will ordinarily contain an overrun, that is, injected air which increases the volume of the soft-serve ice cream and thereby affects its texture.

The above described method of producing and dispensing soft-serve ice cream has significant drawbacks, particularly the criticality of maintaining the mix within a narrowly defined temperature range. Ordinarily, elaborate freezing and dispensing equipment must be used in conjunction with such mixtures in order to achieve the desired texture in the final product.

It is an object of the present invention to provide a novel composition of matter having the texture and eating characteristics of soft-serve ice cream.

It is another object of the present invention to provide an improved composition of matter in which the texture and eating characteristics of soft-serve ice cream may be obtained independently of the formation of ice crystals and over a wider range of temperature than heretofore known in the art.

Still another object of the present invention is to provide a novel method for dispensing a composition of matter so as to obtain a product having the characteristics of soft-serve ice cream.

A further object of the present invention is to provide novel dispensing means for cooling and serving cooled or frozen comestible products.

Still a further object of the present invention is to provide dispensing means for cooled or frozen comestibles which is completely self-contained and portable.

It has now been discovered that a frozen comestible having the texture and eating characteristics of soft serve ice cream may be achieved without the formation of ice crystals by the utilization of a novel, non-dairy composition of matter. Moreover, the novel composition contemplated by the present invention does not require temperatures below its freezing point in order to achieve a soft-serve ice cream type product. In accordance with method aspects of the invention the novel compositions of the present invention may be dispensed at temperatures above those required for the formation of ice crystals by maintaining the amount of injected air or overrun in said composition within certain selected limits. In accordance with apparatus aspects of the invention there is provided novel means for simultaneously dispensing and cooling a comestible in which the refrigerant may act as a propellant for the comestible but does not come into physical contact with the comestible.

The present invention will become apparent from a reading of the following description when taken in conjunction with the accompanying drawings wherein:

FIG. 1 is a perspective view partially in section with parts broken away of one embodiment for dispensing frozen comestibles such as the novel composition of the present invention;

FIG. 2 is a perspective view similar to FIG. 1 of a second dispensing embodiment; and FIG. 3 is a partial sectional view of a third dispensing embodiment.

The composition of the present invention comprises a mixture having a total solids content in the range of 30 to 50 percent by weight, preferably 35-40 percent, the remainder being water. The solids content of the composition is made up of the following materials, the weight per cent ranges given with each material representing the preferred ranges of amounts of each material present in the mixture:

| Ingredient | Weight Per Cent |
|---|---|
| Cane Sugar | 10-45% |
| Dextrose | 0-20% |
| Hydrolyzed Starch Conversion products | 5-30% |
| Lactose | 0-8% |
| Caseinate (e.g. sodium caseinate) | 1-6% |
| Microcrystalline Cellulose | 3-15% |
| Hydrogenated Shortenings | 10-35% |
| Stabilizers | 0.10-1.50% |
| Emulsifiers | 0.10-2.00% |

In addition to the above ingredients, miscellaneous additives including one or more natural or artificial colors and flavors may be added to the composition, for example, chocolate, cocoa, ground spices, coffee, vanilla, fruit, fruit extracts and juices, nutmeats, marshmallow, candy confections, and the like.

The hydrolized starch conversion products which may be employed in the composition include any non-milk carbohydrate solids, for example, hydrolized cereal solid or conversion products such as corn syrup solids, modified soluble starch products, low conversion starch hydrolyzed products, enzyme converted starch products and acid and enzyme converted starch products.

The stabilizer may be a natural or artificial gum, for example, agar-agar, algin, gelatin, guar seed gum, gum acacia, gum tragacanth, Irish moss, pectin, propylene glycol alginate, sodium carboxymethylcellulose carrageenan and the like.

As an emulsifier there may be employed lecithin and modified lecithins such as hydrogenated lecithin, the monoglycerides or diglycerides or both of fat forming fatty acids or the polyoxyethylene emulsifiers. Other typical emulsifiers include polyethylene glycol distearate, polyethylene glycol monooleate, acetylated tartrated glyceride of vegetable oil, polyoxyethylene sorbitan monostrearate, glyceryl monooleate, glyceryl monolinoleate, propylene glycol stearate, glyceryl monostearate, glyceryl lactopalmitate, glyceryl lactostearate, sorbitan monostearate, mono and diglycerides, lactylated mono and diglycerides, sorbitan monooleate, sorbitan monopalmitate, sorbitan monolaurate, polyoxyethylene sorbitan monooleate, polyoxyethylene sorbitan tristearate, polyoxyethylene sorbitan trioleate, polyoxyethylene sorbitan monolaurate, polyoxyethylene sorbitan monostearate, and polyoxyethylene sorbitan monooleate. The hydrogenated shortenings include vegetable shortenings, animal shortenings and combinations of vegetable and animal shortenings.

The composition of the present invention can be prepared in the form of a wet mix directly from base ingredients or, alternatively, in a preferred embodiment can be prepared in the form of a dry mix, which requires only the addition of water and mixing for proper preparation. Thus, the composition may be distributed in bulk, and prepared in final form as needed. In addition, part or all of the ingredients of the composition may be prepared in the form of spray dried combinations which increase the ease and convenience of final preparation of the composition.

The final composition is normally prepared from the dry mix by the addition of water, preferably cool water, so that the final composition ranges between 30 and 50 percent total solids, preferably 35 to 40 percent solids. In the preferred method of preparing the mix, the water is added in stages. A portion of the water is added to form a stiff mixture and to thoroughly wet the particulate solid material and, the balance is then added to the thoroughly wetted mixture.

The above described composition may be dispensed under a variety of conditions so as to achieve either a hard or a soft ice cream product. However, it is a feature of the present invention to dispense the composition under conditions which will result in a product having the characteristics of soft serve ice cream. The composition of the present invention must be dispensed within a particular temperature range and within a particular overrun range in order to achieve the desired effect. In particular, it has been discovered that a relationship exists between the percentage of overrun and the temperature at which the composition must be dispensed in order to duplicate the characteristics of soft serve ice cream. The percentage of overrun refers to the ratio of the volume of air to the original volume of fluid or mix.

In accordance with the present invention a percentage overrun in the range of 45 to 58 percent in the final product results in a composition which will have the characteristics of soft serve ice cream when served at temperatures in the range of 27° to 40° F. Since it is well known in the art that ice crystals are not formed at temperatures above about 27.5° F., the composition of this invention achieves the characteristics of soft serve ice cream without the formation of ice crystals which have heretofore been necessary to give soft serve ice cream its texture. The above stated temperature and overrun ranges are not critical to the formation of an edible product. However, higher overrun percentages require lower temperatures to achieve the characteristics of soft ice cream but at lower temperatures ice crystals will form and the composition of the present invention will approach the consistency of hard ice cream.

The present invention also contemplates novel apparatus for dispensing and cooling food products including the novel ice cream type compositions of the present invention. In particular, the present invention provides an apparatus, in the form of a dispensing unit, and preferably a portable dispensing unit, which permits the simultaneous cooling and dispensing of products such as ice cream. More particularly, the present apparatus invention relates to a self-refrigerating system in which the refrigerant acts as a propellant for the food product but does not come into physical contact with the food product.

Referring more particularly to the drawings, three alternative embodiments of a dispensing unit constructed in accordance with the invention are illustrated. FIG. 1 depicts a dispensing unit, generally designated by the numeral 10, and which for purposes of illustration is shown as a cylindrical portable unit. The dispensing unit includes a housing 11 which houses a flexible product bag 12 containing the product 14, such as the novel composition heretofore described. The product bag is detachably connected to a product conduit 16 which leads to a product dispensing or output nozzle 18. The manner of connecting the product bag to the product conduit is not critical and may comprise tie means 20 or a variety of clamping, threading or other mating means which will readily occur to those persons skilled in the art. The flow of product in the dispensing unit is regulated by product-control valve 22 operated by an externally exposed push-button or other conventional valve control 24.

Dispensing unit 10 is divided into first and second chambers 26, 28 the lower chamber 26 serving as a housing for the flexible product bag and the upper chamber 28 acting as an exhaust chamber for the propellant-refrigerant. Surrounding the flexible product bag in first chamber 26 is a refrigerant which is maintained under pressure and in a liquid state. The dispensing unit is divided into first and second chambers 26, 28 by means of a partition wall and the surrounding housing walls of the dispensing unit 10.

Mounted on retaining wall 30 is a pressure-relief valve 32 for controlling the outflow of refrigerant. Valve 32 is linked with product-control valve 22 so as to be simultaneously opened or closed therewith upon operation of control 24. The refrigerant valve 32 communicates at one end with the lower chamber 26 which houses the compressed liquid refrigerant, the other end being connected with a coil 34 disposed about the product conduit. The coil terminates in a refrigerant gas outlet 36 disposed in upper chamber 28. Alternatively outlet 36 may extend into collar 37 or into walls 11 so that the gases vent into the atmosphere rather than into upper chamber 28.

The fluid pressure of the refrigerant within lower chamber 26 continuously acts upon flexible bag 12, squeezing the same, and causing product to pass through product conduit 16 and product nozzle 18 when product valve 22 is opened by the operation of control means 22. Refrigerant control valve 32 will simultaneously open with product valve 24 thereby causing the compressed refrigerant to expand and evaporate, as a gas, through coils 34 and the outlet nozzle 36 into upper exhaust chambers 28. The expansion of the refrigerant fluid is, of course, accompanied by a significant reduction in temperature. The cold gas produced by the expansion acts as a coolant for the product flowing in conduit 16. The above described sequence of operations within the dispenser are actuated by operation of control 24 by the user and product will continue to flow and be cooled as long as the control is activated. The amount of product dispensed and cooled during any operation of the control is not critical and either small or large servings of food product can be dispensed without affecting the operation of the dispenser and without any effect on the remaining product retained within the bag 12. Thus product may be dispensed in multiple portions at different times and the dispenser containing food product may be stored during the intervals between uses.

Any conventional refrigerant can be employed as the coolant material of the present invention. Typical useful refrigerant materials are liquid fluorinated hydrocarbons, ammonia, carbon dioxide and nitrous oxide. The amount of refrigerant and the pressure of the refrigerant within the dispensing unit will depend upon the particular refrigerant selected. Sufficient refrigerant must be present to achieve both the cooling and dispensing functions. This amount can readily be determined by a conventional calculation to determine the amount of sensible and/or latent heat to be removed from the product to be dispensed and a determination of the amount and pressure of refrigerant required to take up the calculated amount of heat. A sufficient excess of pressure will be provided to provide a dispensing force sufficient to propel the contents of the flexible bag 12 at all times. In a preferred embodiment the pressure in excess of that required for cooling will be at least 40 psi.

Although the utilization of the dispensing unit of the present invention obviates the necessity for admixing propellant directly with the food product to be dispensed, such propellants may still be employed, particularly where it is desired to aerate the final product. Thus, edible propellants including nitrous oxide, selected fluorinated hydrocarbons such as octafluorocyclobutane, chloropentafluoroethane and combinations thereof may be added to the flexible product bag. These materials will expand through valve 22 so that the product exiting from the product nozzle 18 will contain any amount of air desired. The use of materials under pressure which will aerate the product is particularly preferred where an overrun is desired in the final product, e.g. in the soft serve ice cream type compositions of the present invention. It will be understood that where a propellant is incorporated within the product, additional refrigerant pressure for the purpose of dispensing the product is unnecessary.

The materials of construction of the heretofore described dispensing unit are not critical and conventional materials which are compatible with food stuffs and are capable of resisting the corrosive effects of the refrigerant should be employed. In particular, the dispensing unit walls can be constructed of any suitable metal for example, aluminum, steel, stainless steel, or special alloys, while the flexible product bag may be made from natural or synthetic rubbers, rubberized fabrics or thermoplastic materials such as Teflon, high density polypropylene, impregnated canvas or laminated materials. It will be understood by those persons skilled in the art that the walls 11 of the dispenser 10 and the partition wall 30 must be made of sufficient thickness to withstand the pressures which will be exerted by the refrigerant. Such pressures will, of course vary with different refrigerants, being relatively low for fluorinated hydrocarbon refrigerants or ammonia and relatively high in the case of a refrigerant such as carbon dioxide.

While the product bag is made of flexible material as above described, the product conduit 16 is preferably constructed of metallic or other material having high heat conductivity since it is desired that the product be rapidly cooled as it passes through the product conduit. While FIG. 1 depicts a cooling conduit 34 in helical or spiral form surrounding the product conduit 16 the present invention is not limited to a particular structural arrangement and the cooling conduit may take the form of a large concentric conduit 38 surrounding product conduit 16 as shown in FIG. 2. In the event a greater cooling surface is desired, the cooling conduit may be formed of a concentric, spiralized, cooling conduit 42 surrounding a spiralized product conduit 44 as shown in FIG. 3.

In the event that the dispensing unit 10 is a disposable unit, no further structure is needed to complete the unit. However, it is desired to make the cooling and dispensing unit in reusable form, the dispensing unit 10 may be fitted with a removable bottom section 46 through which the empty flexible product bag 12 may be removed after disconnecting it from product conduit 16 by means of tie means 20. Alternatively, the dispensing unit may be made separable at some intermediate point by dividing the can into matable male and female members. A full product bag may then be inserted through the same opening and connected to the product conduit, thereafter placing the removable bottom 46. Sufficient refrigerant under pressure may then be added to the structure via needle valve 48 provided in the bottom of the dispensing unit. In addition, valve means (not shown) may be provided in the retaining wall 30 for venting exhausted refrigerant gases to the atmosphere prior to refilling the lower chamber for renewed use.

While it is to be expected that some variation in product temperature may occur as the pressure in the dispensing unit is reduced during use, such reductions will not materially affect the successful utilization of the unit when it is employed to dispense products where an exact product temperature is not critical. Thus, for example, the soft serve ice cream characteristics of the novel composition of the present invention may be obtained over a rather broad range of temperatures and the composition can be readily maintained within that range when employing the dispensing unit of the present invention. In addition, other food products, which do not have critical serving temperatures may be dispensed using the novel method and apparatus of the invention. Typical examples are whipped cream, heavy malt or milk shake type products and yogurt.

The present invention will be further understood by reference to the following illustrative example: 1 pound of a soft serve ice cream composition having the following composition is prepared by admixing the following ingredients:

| | |
|---|---|
| Water | 60% |
| Cane Sugar | 12.4% |
| Hydrogenated Vegetable Shortening | 11.6% |
| Corn Syrup Solids | 8.0% |
| Dextrose | 2.0% |
| Lactose | 1.2% |
| Micro Crystalline Cellulose | 3.6% |
| Sodium Caseinate | 0.8% |
| Stabilizer | 0.16% |
| Emulsifier | 0.24% |
| Flavor | To Taste |

The above product is prepared by mixing approximately one-half the water with the dried solid materials until the particulate matter is thoroughly wetted whereupon the remainder of the water is added.

By calculation it is determined that if the above-identified ice cream composition is to be cooled from room temperature (75°F.) to a product having 48 percent ice crystals at 20°F. it will require the removal of 44.0 BTU's of sensible heat and 41.6 BTU's of latent heat of fusion.

The ice cream composition is disposed in a flexible plastic bag along with sufficient propellant, e.g. nitrous oxide, to aerate the mixture so as to achieve a 45 percent overrun.

The dispensing unit is charged with a fluorinated hydrocarbon refrigerant at a pressure of 40–100 psi so as to accomplish the removal of 85.6 BTU's of heat from the ice cream composition.

Having thus described the general nature as well as specific embodiments of the invention, the true scope will now be pointed out in the appended claims.

What is claimed is:

1. An apparatus for dispensing cooled comestibles comprising a dispenser divided into first and second chambers, a flexible product container disposed in said first chamber, a product dispensing conduit connected to said product container, said product dispensing conduit extending into said second chamber, control means connected to said conduit for regulating the flow of product therethrough, a refrigerant fluid under pressure surrounding said product container in said first chamber, pressure relief means connecting said first chamber with said second chamber, and means connecting said control means and said pressure relief means whereby said pressure relief means is operated by said control means.

2. The apparatus of claim 1 wherein said refrigerant fluid is a liquid selected from the class consisting of fluorinated hydrocarbons, ammonia, nitrous oxide and carbon dioxide.

3. The apparatus of claim 1 having a second conduit disposed about said product conduit in said second chamber, said second conduit communicating with said pressure relief means.

4. The apparatus of claim 3 wherein said second conduit is a continuous coil wound about said product dispensing conduit in said second chamber.

5. The apparatus of claim 3 wherein said second conduit is disposed concentrically about said product dispensing conduit in said second chamber.

6. The apparatus of claim 1 wherein said dispenser has a removable section communicating with said first chamber providing a passageway for introducing and removing said flexible product container from said dispenser.

7. The apparatus of claim 1 wherein the dispenser is provided with additional valve means communicating with said first chamber for admitting refrigerant to said first chamber.

* * * * *